US012228730B2

(12) United States Patent
Weng et al.

(10) Patent No.: US 12,228,730 B2
(45) Date of Patent: Feb. 18, 2025

(54) TWO-DIMENSIONAL EXIT PUPIL EXPANSION METHOD FOR WAVEGUIDE DISPLAY BASED ON POLARIZATION VOLUME GRATINGS

(71) Applicant: SOUTHEAST UNIVERSITY, Nanjing (CN)

(72) Inventors: Yishi Weng, Nanjing (CN); Yuning Zhang, Nanjing (CN); Yuchen Gu, Nanjing (CN); Lixuan Zhagn, Nanjing (CN); Chuang Wang, Nanjing (CN); Ran Wei, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 18/711,640

(22) PCT Filed: Dec. 29, 2022

(86) PCT No.: PCT/CN2022/143663
§ 371 (c)(1),
(2) Date: May 20, 2024

(87) PCT Pub. No.: WO2023/125876
PCT Pub. Date: Jul. 6, 2023

(65) Prior Publication Data
US 2024/0418986 A1    Dec. 19, 2024

(30) Foreign Application Priority Data

Dec. 29, 2021    (CN) .......................... 202111636763.1

(51) Int. Cl.
*G02B 6/35* (2006.01)
*G02B 6/34* (2006.01)
*G02B 27/00* (2006.01)

(52) U.S. Cl.
CPC ........... *G02B 27/0081* (2013.01); *G02B 6/34* (2013.01)

(58) Field of Classification Search
CPC .............................. G02B 27/00; G02B 6/0035
USPC ........................................................... 385/37
See application file for complete search history.

(56) References Cited

U.S. PATENT DOCUMENTS

| 9,733,475 B1* | 8/2017 | Brown | G02B 6/003 |
| 11,181,741 B1* | 11/2021 | Yaroshchuk | G02B 30/25 |
| 2010/0149073 A1* | 6/2010 | Chaum | G02B 27/0075 345/8 |

(Continued)

FOREIGN PATENT DOCUMENTS

| CN | 109917547 A | 6/2019 |
| CN | 110824613 A | 2/2020 |

(Continued)

*Primary Examiner* — Kaveh C Kianni
(74) *Attorney, Agent, or Firm* — Bayramoglu Law Offices LLC

(57) ABSTRACT

A two-dimensional exit pupil expansion method for waveguide display based on polarization volume gratings (PVGs) is provided. Based on the polarized diffraction properties of the PVGs as waveguide coupling elements, a light beam from a microimage source system is introduced into and then propagates in a waveguide medium. By a composite PVG structure, a light field of a transmitted image is subjected to two-dimensional exit pupil expansion and emission, and finally incident into human eyes to achieve waveguide augmented reality imaging.

3 Claims, 11 Drawing Sheets

(56) References Cited

U.S. PATENT DOCUMENTS

| | | | | |
|---|---|---|---|---|
| 2012/0075168 | A1* | 3/2012 | Osterhout | G06F 3/017 345/8 |
| 2012/0194550 | A1* | 8/2012 | Osterhout | G06F 1/163 345/633 |
| 2012/0212398 | A1* | 8/2012 | Border | G06Q 30/02 345/8 |
| 2012/0212400 | A1* | 8/2012 | Border | G02B 27/017 345/8 |
| 2012/0235884 | A1* | 9/2012 | Miller | G06F 3/013 345/8 |
| 2013/0051730 | A1* | 2/2013 | Travers | G02B 27/4272 385/37 |
| 2013/0127980 | A1* | 5/2013 | Haddick | G06F 3/013 348/14.08 |
| 2013/0278631 | A1* | 10/2013 | Border | G06F 3/04842 345/633 |
| 2017/0184848 | A1* | 6/2017 | Vallius | G02B 27/4261 |
| 2017/0293145 | A1* | 10/2017 | Miller | G02B 27/0172 |
| 2017/0322419 | A1* | 11/2017 | TeKolste | G02B 27/4205 |
| 2017/0373459 | A1* | 12/2017 | Weng | G02B 27/4261 |
| 2018/0059297 | A1* | 3/2018 | Peroz | G02B 27/1086 |
| 2018/0143509 | A1* | 5/2018 | Oh | G02B 6/0076 |
| 2018/0164627 | A1* | 6/2018 | Oh | G02F 1/292 |
| 2018/0196263 | A1* | 7/2018 | Vallius | G02B 27/0172 |
| 2018/0239177 | A1* | 8/2018 | Oh | G02B 26/0825 |
| 2018/0275350 | A1* | 9/2018 | Oh | G02B 6/0016 |
| 2018/0284460 | A1* | 10/2018 | Cheng | G02B 27/1026 |
| 2018/0356639 | A1* | 12/2018 | Schaefer | G02B 27/017 |
| 2019/0004325 | A1* | 1/2019 | Connor | G02B 27/0172 |
| 2019/0086674 | A1* | 3/2019 | Sinay | G02B 27/0172 |
| 2019/0107719 | A1* | 4/2019 | Edwin | G09G 3/003 |
| 2019/0129178 | A1* | 5/2019 | Patterson | G02B 6/0076 |
| 2019/0227375 | A1* | 7/2019 | Oh | G02B 27/0172 |
| 2019/0333480 | A1* | 10/2019 | Lang | G06F 3/011 |
| 2020/0012095 | A1* | 1/2020 | Edwin | G02B 6/0028 |
| 2020/0192130 | A1* | 6/2020 | Maimone | G02B 27/0172 |
| 2020/0368616 | A1* | 11/2020 | Delamont | H04N 13/239 |
| 2021/0231986 | A1* | 7/2021 | Oh | G02F 1/137 |
| 2021/0294106 | A1* | 9/2021 | Meitav | H04N 9/31 |
| 2021/0311310 | A1* | 10/2021 | Trisnadi | G02B 27/0172 |
| 2021/0311316 | A1* | 10/2021 | TeKolste | G02B 6/0026 |
| 2021/0318566 | A1* | 10/2021 | Oh | G02F 1/0136 |
| 2021/0397004 | A1* | 12/2021 | Schowengerdt | G02B 6/0076 |
| 2022/0011578 | A1* | 1/2022 | Sinay | G02B 6/0023 |
| 2022/0035161 | A1* | 2/2022 | Sinay | G02B 27/0172 |
| 2022/0050298 | A1* | 2/2022 | Klug | G02B 27/18 |
| 2022/0082824 | A1* | 3/2022 | Jarvenpaa | G02B 27/0101 |
| 2022/0099977 | A1* | 3/2022 | Meitav | G02B 27/0101 |
| 2022/0171190 | A1* | 6/2022 | Trisnadi | G02B 30/24 |
| 2023/0393398 | A1* | 12/2023 | Oh | G06F 3/013 |
| 2024/0201429 | A1* | 6/2024 | Vostrikov | G02B 27/0172 |
| 2024/0248313 | A1* | 7/2024 | Komanduri | G02B 27/0172 |

FOREIGN PATENT DOCUMENTS

| | | |
|---|---|---|
| CN | 113325506 A | 8/2021 |
| CN | 113589528 A | 11/2021 |
| CN | 114236819 A | 3/2022 |
| WO | 2020088055 A1 | 5/2020 |

* cited by examiner

TWO-DIMENSIONAL EXIT PUPIL EXPANSION METHOD FOR WAVEGUIDE DISPLAY BASED ON POLARIZATION VOLUME GRATINGS

CROSS-REFERENCE TO THE RELATED APPLICATIONS

This application is the national phase entry of International Application No. PCT/CN2022/143663, filed on Dec. 29, 2022, which is based upon and claims priority to Chinese Patent Application No. 202111636763.1, filed on Dec. 29, 2021, the entire contents of which are incorporated herein by reference.

TECHNICAL FIELD

The present invention relates to a two-dimensional pupil expansion structure and method for waveguide display based on polarization volume gratings (PVGs), for use in a wearable augmented reality (AR) display apparatus to achieve high-quality efficient waveguide imaging with large exit pupil and wide field of view and reduce the volume and weight of the apparatus

BACKGROUND OF THE INVENTION

As a hot spot in the technical field of information display at present, AR near-eye display technology is developed with the good vision of people for the information interaction mode in future. It has broad application prospects in both civilian (such as AR glasses) and military (such as pilot helmets) scenes. Despite the rapid development of the current AR technology, the development of the most basic AR display devices is still lagging behind compared with that of AR content, computation, and network, and the volume, weight, and display quality of display modules still cannot meet the needs of people.

To solve the problems of thick near-eye optical component and limited exit pupil size in a large field of view in the traditional near-eye optics, the existing diffractive waveguide imaging technology has been widely concerned in the academic and industrial communities. Simply speaking, this technology is to introduce a light field of an image into a waveguide medium by means of gratings used as coupling elements, then transmit the collimated and enlarged light field of the image at extremely low losses by virtue of the total reflection condition of the waveguide medium, and finally emit the light field out of the waveguide medium and into human eyes by means of the diffraction of the gratings. Compared with the near-eye display solutions based on the principle of geometric optics (such as a prism solution and a free-form surface solution), an optical waveguide structure is thinner (generally 0.5 mm-2 mm), which is almost the same as the commonly used eyeglasses lens and is closer to the definition of the so-called "AR glasses". In addition, the main advantages of an optical waveguide also include exit pupil expansion that is achieved by constantly replicating and emitting light beams during waveguide transmission, whereby the inverse relationship between the size of exit pupil and the FOV in the Lagrange's optical invariant is broken to achieve a large range of exit pupil.

As a core device, the waveguide coupling grating has the effect of introducing and emitting the light field into and out of the waveguide medium. Its diffraction property directly affects the final optical efficiency and imaging quality of the system. At present, the mainstream waveguide coupling gratings can be categorized into two types, namely, surface relief gratings (SRGs) and volume holographic gratings (VHGs). From the perspective of imaging principle, the diffractive waveguide has strict requirements for the diffractive property of the coupling grating. First, the grating needs to have a large diffraction angle (±1 level) to ensure that the diffracted light satisfies the total reflection condition of the waveguide, and also needs to have high diffraction efficiency (to ensure the image transmission efficiency), single-stage diffraction property (to prevent the occurrence of stray light and ghost image), large response bandwidth (to ensure FOV and color uniformity), high transmittance for external ambient light (to avoid affecting the reception of the light field of a real scene by human eyes), and accurate efficiency control capacity (exit pupil uniformity), or the like. To meet these requirements, the design and production of waveguide coupling gratings encounter huge challenges.

Overall, no matter SRG or VHG, the design and production processes and properties of the waveguide coupling grating at present cannot meet the high-quality imaging requirements of diffractive waveguides. The diffractive optical waveguide imaging still faces bottleneck problems such as low optical efficiency, small FOV, exit pupil non-uniformity, and bad color rendering.

The inventor team has previously disclosed a novel polarization volume grating (PVG) in patents US20170373459, CN201811286578, and WO2020088055. This grating can be in essence taken as a cholesteric-phase liquid crystal with two-dimensional periodicity, which is formed depending on the polarization interference with light orientation and the self-assembly property of the cholesteric-phase liquid crystal. Interestingly, the diffraction property of this grating exhibit both the Bragg diffraction of the volume grating and the polarization selectivity of the Pancharatnam-Berry (PB) phase grating. As can be seen from the studies on the diffraction properties and production process of this novel grating, compared with SRG and VHG, the PVG can better meet the requirements of diffractive optical waveguide imaging technology in many aspects such as performance and production complexity.

However, there is a lack of effective theoretical guidance and specific method on how to break through the bottlenecks of existing diffractive waveguides in terms of field of view, exit pupil or the like by using the excellent properties of PVGs. In view of the above problems, the present invention relates to a large exit pupil waveguide structure based on polarization volume gratings and an imaging method. The exit pupil expansion and emission of the light field of the transmitted image are completed by means of a grating fork composite structure of the PVGs, to thereby achieve large exit pupil waveguide imaging with the PVG waveguide solution, which in turn promotes the further development of the diffractive waveguide AR display technology.

BRIEF SUMMARY OF THE INVENTION

Technical problem: The technical problem to be solved by the present invention is to provide a two-dimensional exit pupil expansion method for waveguide display based on polarization volume gratings, whereby, with limited waveguide volume and weight, the high-quality efficient AR waveguide imaging with large exit pupil and large field of view is achieved based on the unique polarized diffraction properties of the novel PVG and the waveguide solutions.

Technical solution: To solve the above-mentioned technical problems, the present invention provides a two-dimensional exit pupil expansion method for waveguide display based on polarization volume gratings (PVGs), which uses the PVGs as waveguide couplers to achieve a two-dimensional pupil expansion effect at an exit pupil position through a grating fork composite structure in an optical waveguide near-eye imaging system.

The grating fork composite structure mainly includes a waveguide medium and a two-layer out-coupling grating formed by compositing the PVGs, and the two-layer out-coupling grating at the same horizontal position as the waveguide medium; an in-coupling grating and the out-coupling grating are disposed at different positions on a waveguide; and when arranged according to a light beam transmission path, the gratings as a whole are disposed inside or outside the waveguide medium.

The waveguide medium is an optical medium having certain refractive index and transmittance, with the refractive index in a range of 1.5-2.2.

A material for the waveguide medium is optical glass, or resin glass with high transparency, and the waveguide medium is shaped as a flat plate or an additional free-form surface.

At least two PVGs are provided at different positions on the waveguide medium and configured to complete introduction of light rays into the waveguide medium and emission of exit pupil-expanded light rays, respectively; and the two PVGs are called the in-coupling grating and the out-coupling grating, respectively.

The in-coupling grating has certain polarization selectivity and can diffract and emit a left-handed or right-handed elliptically polarized light beam at an angle at which a total reflection condition of the waveguide medium is satisfied, such that the light beam propagates in the waveguide in a total reflection way.

The out-coupling grating is disposed at another position on the waveguide medium, and again, can re-diffract the light beam in the waveguide at an angle smaller than the angle at which the total reflection condition of the waveguide medium is satisfied, to thereby emit the light beam in the waveguide medium out of the waveguide and introduce the light beam into a next human eye or other visual optical systems.

The out-coupling grating is formed by compositing at least two PVGs in different grating vector directions; and the composited grating can first steer the light beam transmitting in the waveguide medium to change a propagation path of the light beam in the waveguide, and at the same time emit the light beam out of the wave guide when the light beam is incident into the grating again after the steering, to thereby achieve functions of exit pupil expansion and coupled emission.

The in-coupling grating can further efficiently diffract and couple any polarized light beams by compositing two types of polarization-responsive PVGs.

The PVGs include: the in-coupling grating and the out-coupling grating, wherein the out-coupling is a composite grating having at least two types of grating vectors in different directions.

The PVGs are cholesteric-phase liquid crystal layers with two-dimensional periodicity, as well as Bragg diffraction characteristics and polarization selectivity.

Advantageous effects: Different from the SRG used in the traditional waveguide structure, the PVG has the characteristics of high diffraction efficiency, low cost, and ease of production. In addition, in the traditional two-dimensional exit pupil expansion waveguide structure, three grating regions are needed, two of which are configured to complete the coupled introduction and emission of a light beam, and one of which is additionally required for the steering of the light beam. According to the structure disclosed by the present invention, with the excellent polarized diffraction properties of PVGs, the present invention greatly reduces a waveguide area and accordingly a propagation distance of the light beam by only using two grating regions in a waveguide exit pupil expansion structure, such that the loss and scattering of the light beam in the waveguide are further reduced while the volume and weight of a waveguide device are reduced, which increases a final imaging effect.

BRIEF DESCRIPTION OF THE SEVERAL VIEWS OF THE DRAWINGS

The technical solutions of the present invention are further explained below in combination with the accompanying drawings.

Figure 1:
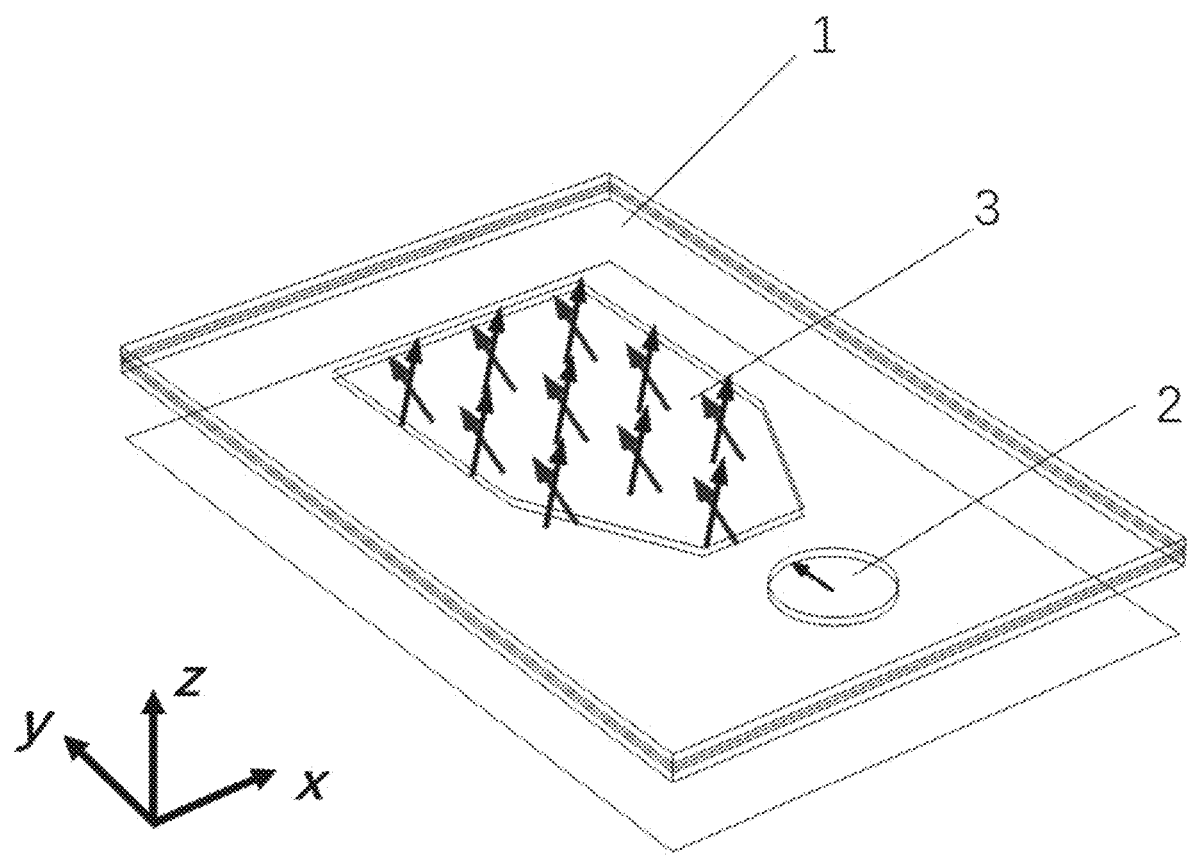
FIG. 1 is a schematic diagram of a waveguide structure for high-efficiency two-dimensional exit pupil expansion based on composite polarization volume gratings according to the present invention.

In the figures, reference signs are as follows: 1, waveguide medium; 2, in-coupling grating; 3, out-coupling grating; 3.1, first grating component; 3.2 second grating component; 4, right exit pupil-expanded waveguide propagation light beam; 5, left exit pupil-expanded waveguide propagation light beam; 6, optical matching layer; 7, microimage source optical engine; and 8, microimage source image beam.

DETAILED DESCRIPTION OF THE INVENTION

With the PVGs used as waveguide couplers, the present invention achieves a two-dimensional exit pupil expansion effect at an exit pupil position by means of a grating fork composite structure. The waveguide structure main includes two elements, namely a waveguide medium and PVGs.

The waveguide medium is an optical medium having certain refractive index and transmittance, and the material of the waveguide medium may be optical glass, or resin glass with high transparency. The refractive index is in a range of 1.5-2.2, preferably in an optional range of 1.8-2.0. The waveguide medium may be shaped as a flat plate or an additional free-form surface. At least two PVGs are provided at different positions on the waveguide medium and configured to complete introduction of light rays into the medium and emission of exit pupil-expanded light rays, respectively; and the at least two PVGs are called an in-coupling grating and an out-coupling grating respectively in the present invention.

The in-coupling grating has certain polarization selectivity and can diffract and emit a rotary (left-handed or right-handed) elliptically polarized light beam at an angle at which a total reflection condition of the waveguide medium is satisfied, such that the light beam propagates in the waveguide in a total reflection way. The out-coupling grating is disposed at another position on the waveguide medium, and again, can re-diffract the light beam in the waveguide at an angle smaller than the angle at which the total reflection condition of the waveguide medium is satisfied, to thereby emit the light beam in the waveguide medium out of the waveguide and introduce the light beam into a next optical system, such as human eyes or other visual optical systems.

Further, the out-coupling grating is formed by compositing at least two PVGs in different grating vector directions. The composited grating can first steer the light beam transmitting in the waveguide medium to change a propagation path of the light beam in the waveguide, and at the same time emit the light beam out of the wave guide when the light beam is incident into the grating again after the steering, to thereby achieve functions of exit pupil expansion and coupled emission.

Further, the in-coupling grating may further efficiently diffract and couple any polarized light beams (left-handed plus right-handed) by compositing two types of polarization-responsive PVGs.

Based on the polarized diffraction characteristics of PVGs, a light beam from a microimage source system is introduced into and propagates in a waveguide medium. Then, by means of a composite PVG structure, a light field of a transmitted image is subjected to two-dimensional exit pupil expansion and emission, and is finally incident into human eyes, to thereby achieve the function of waveguide augmented reality imaging.

Figure 2:
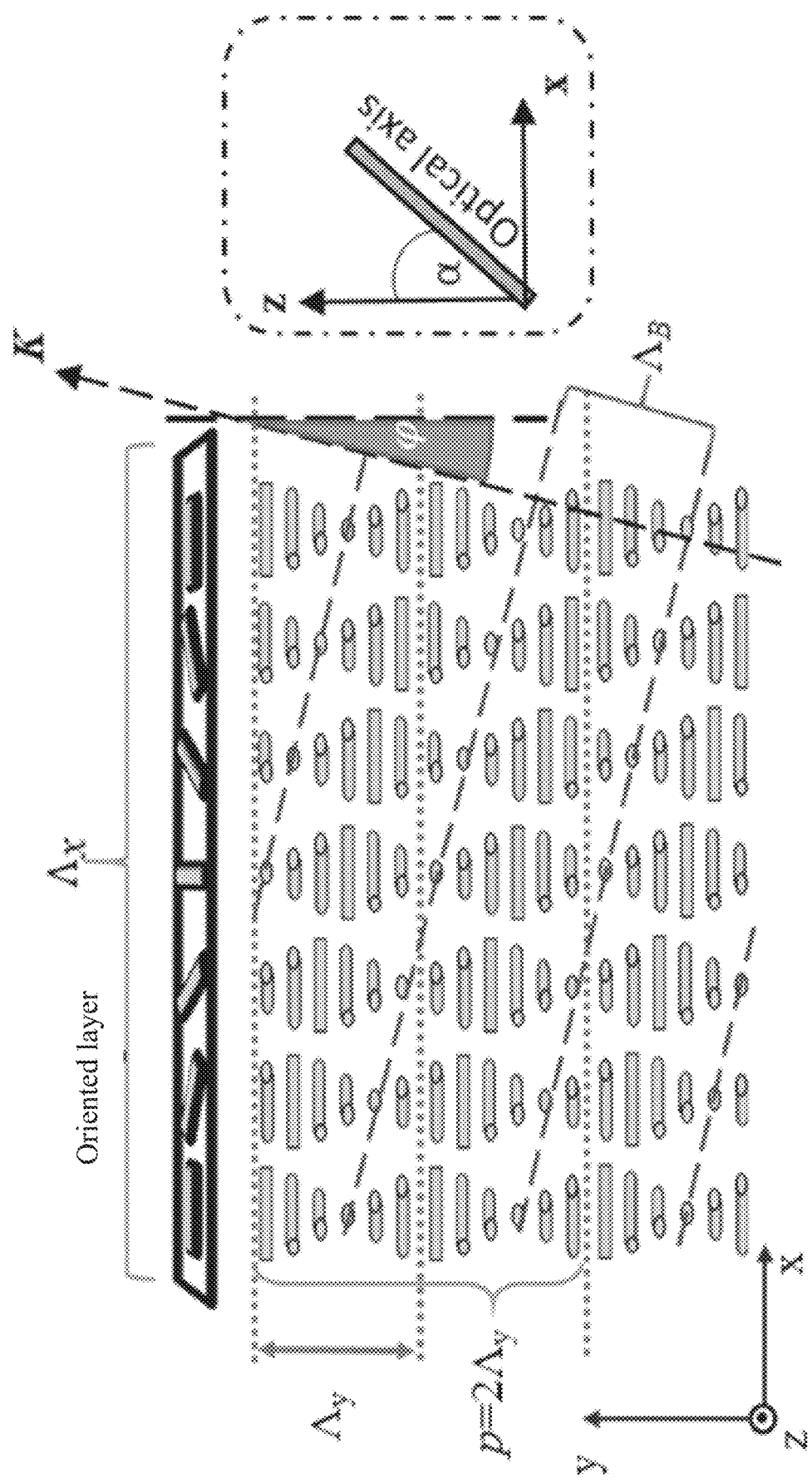
FIG. 2 is a structural diagram showing the principle of the PVGs according to the present invention.

The structural diagram of the waveguide PVG used in the present invention is shown in FIG. 2. The optical axis in a PVG medium is present as a three-dimensional periodic rotary structure. As a PB phase grating, the period of rotation of liquid crystal molecules in a transverse direction (i.e., a direction x in FIG. 1) is generally produced with the orientation of an oriented material. An orientation pattern on the oriented material is the same as that on the PB phase grating, and its optical axis rotates at different angles α (azimuth angle) around a z-axis in an x direction. The continuous change of a results in a rotation period $\Lambda_x$ in the x direction. In addition to the periodic rotation in the x direction, the optical axis also rotates at another dimension in a longitudinal direction (y direction), resulting in a rotation period $\Lambda_y$. In practice, in order to produce such a structure, we need to construct the periodic rotation of liquid crystal molecules in the x direction on the orientation layer by using a polarization holographic interference exposure method, and at the same time add a certain amount of chiral dopant to a liquid crystal material to allow for rotation of the liquid crystal molecules in the y direction, thereby resulting in a periodic rotation state in the y direction. Here, the period in the x direction may be changed by adjusting the exposure angle of two coherent light beams in the holographic exposure, while the period in the y direction may be modulated by means of concentration according to the helix twist power (HTP) of the chiral dopant.

With such a structure, a three-dimensional birefractive-index periodic distribution is actually created, with a plane of equal refractive index (shown by the dashed line in FIG. 2) inclined at a certain angle (φ). It can be predicted that this three-dimensional periodic refractive-index distribution has the characteristic of a volume grating, and Bragg diffraction may occur only when the angle and wavelength of an incident light beam meet certain conditions. However, unlike the traditional volume grating, the refractive-index distribution here exhibits anisotropic periodical changes, and the form of the PB phase grating is presented in the x direction, which also responds to the polarization of the incident light beam.

As shown in FIG. 2, when the transverse and longitudinal periods of the PVG are $\Lambda_x$ and $\Lambda_y$, the inclination angle of the plane of equal refractive index should be $\varphi = \pm \arctan(\Lambda_y/\Lambda_x)$. In order to simplify the analysis without loss of generality, it is assumed that $0° < \varphi < 90°$. To achieve the Bragg volume effect, the volume grating is generally required to have a certain thickness (number of periods) to create efficient Bragg diffraction. With regard to the PVG, a certain thickness is also required to allow for sufficient periods in the anisotropic medium.

Under the limitation by the intermolecular forces between the oriented material and the chiral dopant, the liquid crystal molecules periodically rotate in space, and the azimuth angle α of the optical axis in the medium may be characterized by the following equation:

$$\alpha = \frac{\pi}{\Lambda_x} x + \frac{\pi}{\Lambda_y} y, \tag{1}$$

Like the PB grating, due to the equivalence between the optical axis rotations mπ(m=0, 1, 2, 3 . . . ) of the birefractive material, the periods $\Lambda_x$ and $\Lambda_y$ in Equation 1 correspond to a rotation period of x instead of 2π of the optical axis of the liquid crystal. When the thickness of a liquid crystal layer is sufficient, the Brag volume effect occurs. That is, when the angle and wavelength of the incident light meet the Bragg conditions of the grating, efficient diffraction is achieved. In case of a vertically incident light beam (with the incident angle of 0°), the Bragg conditions of the PVG may be expressed by the following equation:

$$2n_{eff}\Lambda_B\cos\varphi = \lambda_B. \tag{2}$$

In Equation 2, $\lambda_B$ represents the Bragg wavelength in vacuum; $\Lambda_B$ represents the Bragg period; φ represents the inclined angle of a refraction index plane or represents the inclined angle of a grating vector K (see FIG. 1); and $n_{eff}$ represents the mean refractive index of an anisotropic medium, which may be defined as follows:

$$n_{eff} = \sqrt{(n_e^2 + 2n_o^2)/3}. \quad (3)$$

From the simple geometric relations, it can be known that the Bragg period $\Lambda_B$ may be expressed using the transverse and longitudinal periods as follows:

$$\begin{cases} \Lambda_x = \Lambda_B/\sin\varphi \\ \Lambda_y = \Lambda_B/\cos\varphi \end{cases}. \quad (4)$$

Depending on the inclined angle of the refractive index plane, the PVG may achieve two diffraction grating functions, namely, reflection and transmittance. The PVG with the diffracted and incident light beams at the same side is called a reflective PVG, and the PVG with the diffracted and incident light at either side is called a transmissive volume grating.

The present invention relates to a solution of two-dimensional exit pupil expansion for near-eye waveguide display based on a PVG diffractive waveguide. The waveguide in this solution has a basic structure shown as in FIG. 1. Three main parts, i.e., a waveguide medium 1, an in-coupling grating 2, and an out-coupling grating 3, are mainly included. The waveguide medium 1 is an optical medium having certain refractive index and transmittance, and the material of the waveguide medium may be optical glass, or resin glass with high transparency. The refractive index is in a range of 1.5-2.2, preferably in an optional range of 1.8-2.0. The waveguide medium may be shaped as a flat plate or an additional free-form surface, which is shaped as a flat plate in this embodiment. The in-coupling grating 2 has a unique direction of grating vector $\overrightarrow{K2}$ and functions to diffract light beams from a microimage source light engine 7, and introduce light beams with the diffraction angles meeting the total reflection condition of the waveguide medium, into the waveguide medium 1, such that the light beams propagate in the waveguide medium 1. The out-coupling grating 3 has a composite PVG structure. The composite PVG structure includes at least two different grating vectors, which are $\overrightarrow{K2}$ and $\overrightarrow{K3}$ in this embodiment. Functionally, the composite PVG structure of the out-coupling grating 3 may diffract the transmitted light beams in the medium 1 to replicate the light beams in a two-dimensional way, destroy the total reflection condition, and emit the light beams out of the waveguide at the same time.

Figure 3C:
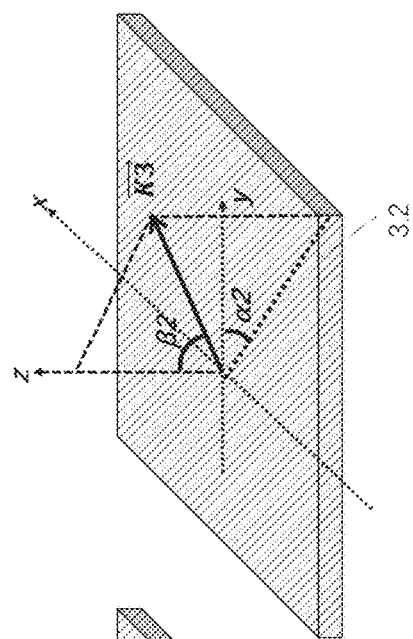
FIGS. 3A-3C show grating vector directions of an in-coupling grating and out-coupling grating components according to the present invention.
Figure 3B:
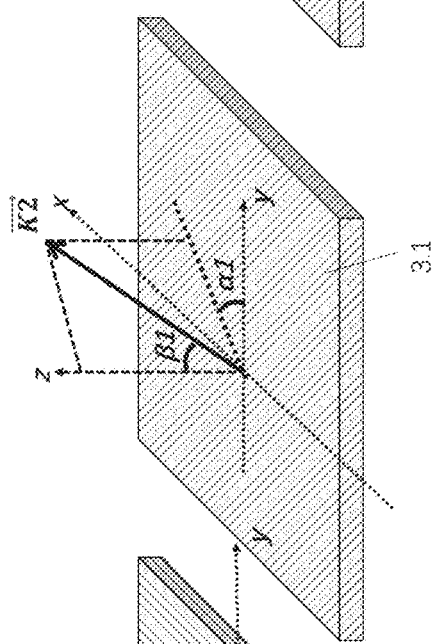
Figure 3A:
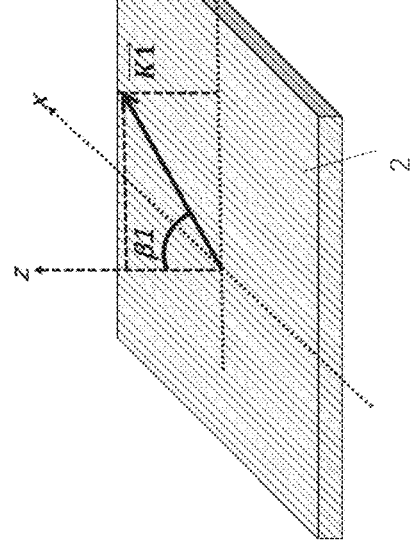
Figure 4:
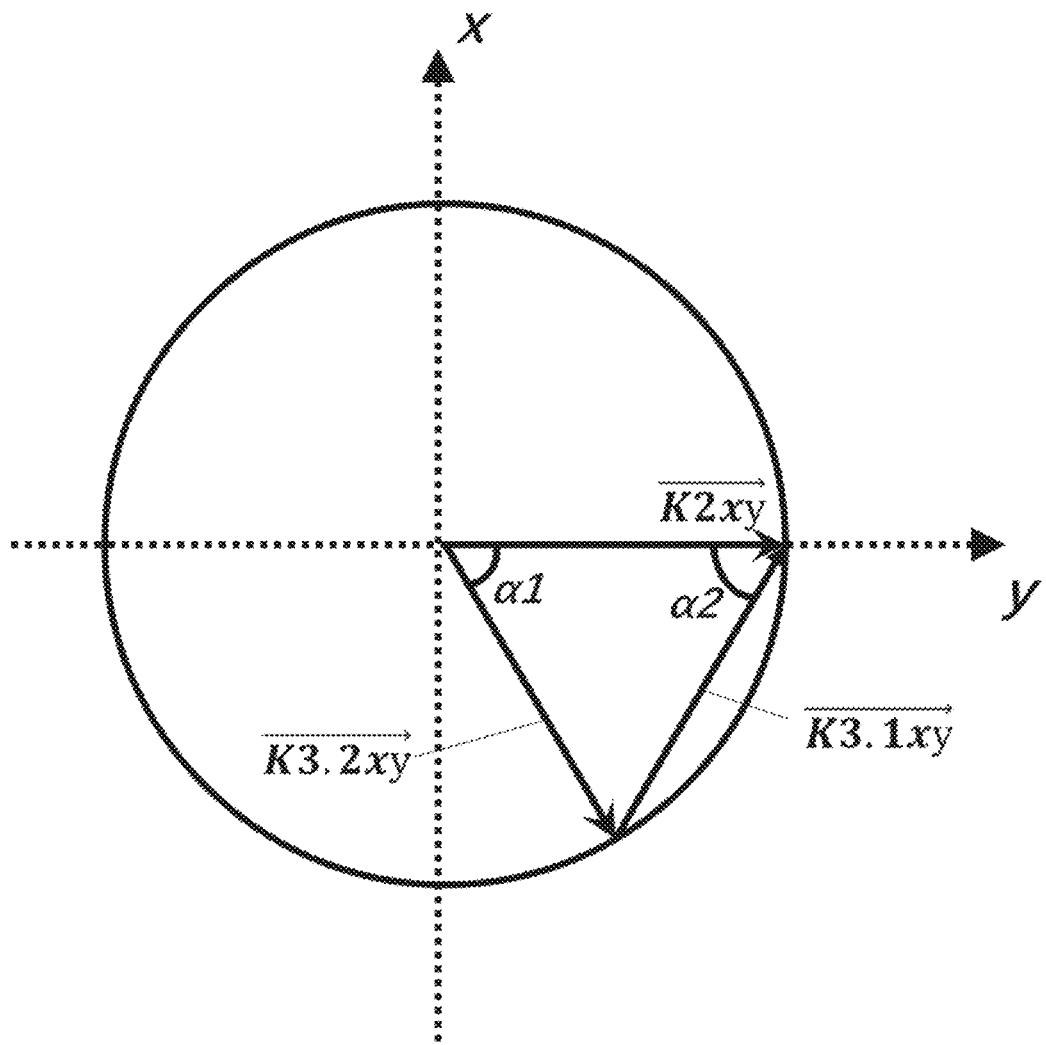
FIG. 4 is a schematic diagram showing the vector relationship that is satisfied by the grating vectors of the in-coupling grating and each out-coupling grating component in x-y plane components according to the present invention.

FIGS. 3A-3C show a method for setting the grating vector directions for the in-coupling grating 2 and the out-coupling grating 3. The grating vector $\overrightarrow{K2}$ of the in-coupling grating 2 is in an yz plane, without any vector in the x direction. The out-coupling grating 3 includes the components of two grating vectors, namely, $\overrightarrow{K3.1}$ and $\overrightarrow{K3.2}$, with $\overrightarrow{K3.1}$ and $\overrightarrow{K3.2}$ having the grating vector components in a +x direction and a −x direction, respectively. FIG. 4 shows three types of grating vectors $\overrightarrow{K2}$, $\overrightarrow{K3.1}$, and $\overrightarrow{K3.2}$ in the in- and out-coupling gratings 2 and 3, and the mutual relations and limitations among the components $\overrightarrow{K2xy}$, $\overrightarrow{K3.1xy}$, and $\overrightarrow{K3.2xy}$ in the xy plane. Preferably, α1 and α2 may be optionally 60°. Specifically, it should be ensured that the vector sum of $\overrightarrow{K2xy}$, $\overrightarrow{K3.1xy}$, and $\overrightarrow{K3.2xy}$ is 0, i.e., $\overrightarrow{K2xy}$+$\overrightarrow{K3.1xy}$+$\overrightarrow{K3.2xy}$=0, thereby ensuring the absence of chromatic dispersion in a waveguide display system.

Figure 5B:
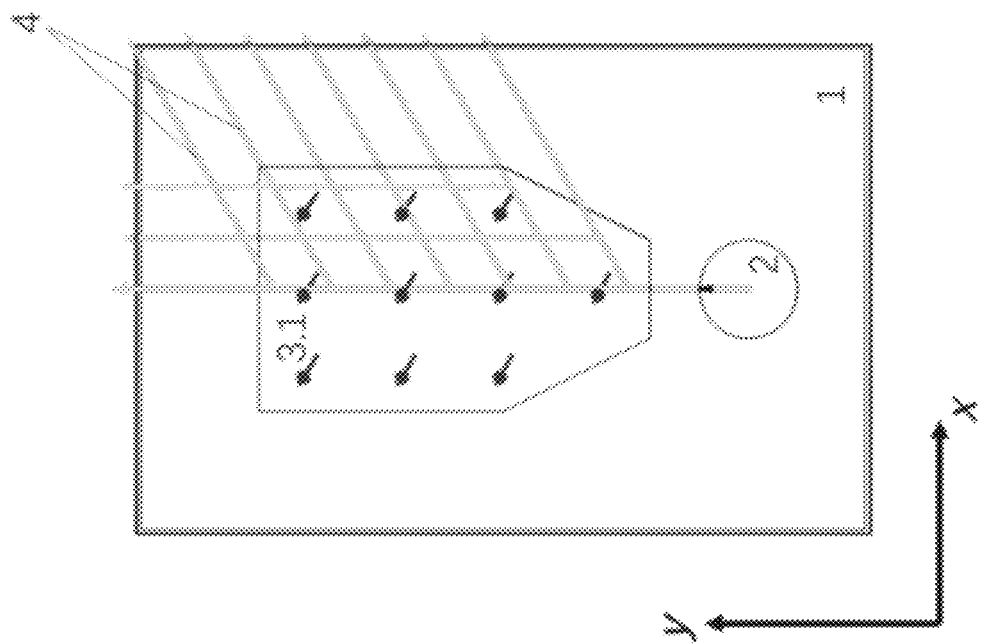
FIGS. 5A-5B show the simulation result of waveguide light path transmission when an out-coupling grating region has only a first grating component 3.1 according to the present invention.
Figure 5A:
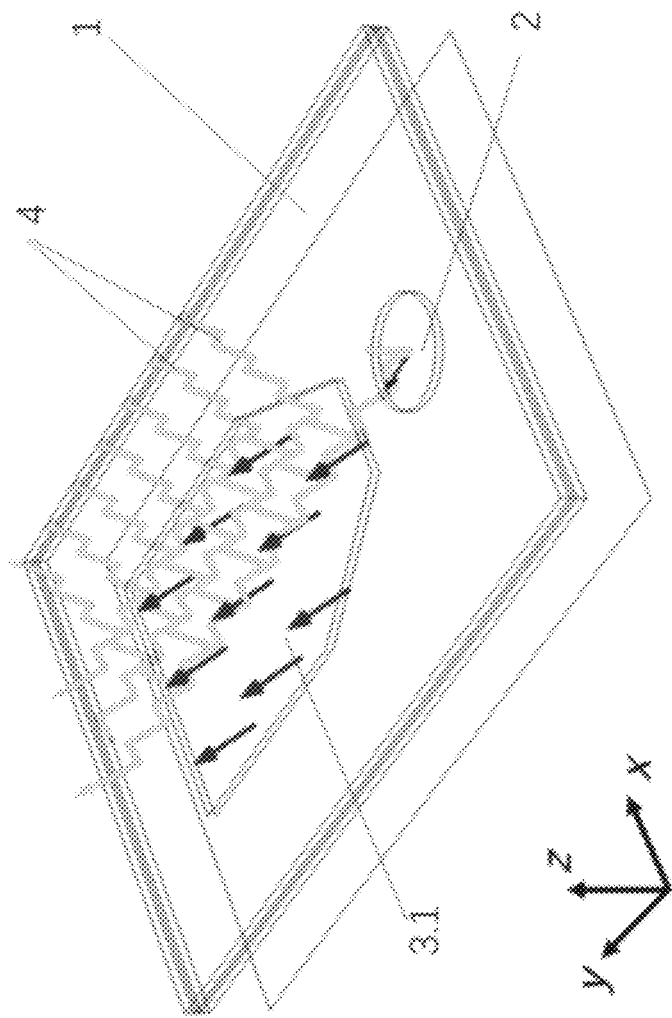
Figure 6B:
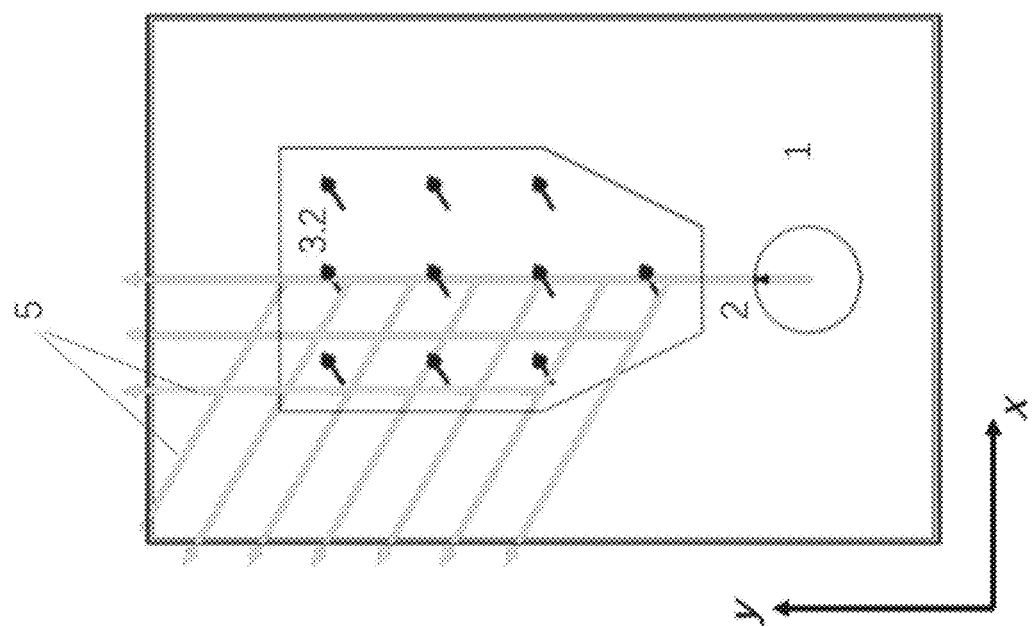
FIGS. 6A-6B show the simulation result of waveguide light path transmission when an out-coupling grating region has only a second grating component 3.2 according to the present invention.
Figure 6A:
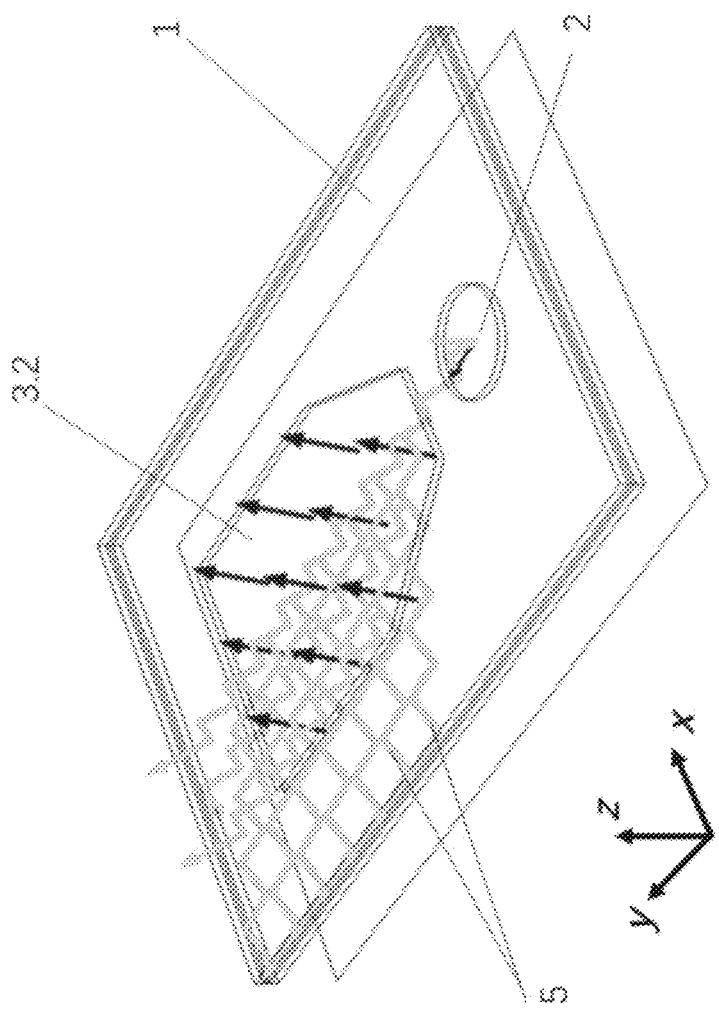

FIGS. 5A-5B and FIGS. 6A-6B show the simulation results of light beam propagation if the out-coupling grating 3 includes only one component, i.e., the grating vector $\overrightarrow{K3.1}$ or $\overrightarrow{K3.2}$ (the corresponding gratings include a first grating component 3.1 and a second grating component 3.2, respectively), respectively. It can be seen that, if the out-coupling grating has only one grating component (3.1 as shown in FIGS. 5A-5B), a right exit pupil-expanded waveguide transmission light beam 4 at the out-coupling grating may be constantly diffracted and split in the +x direction during propagation, to t hereby achieve the function of two-dimensional replication and expansion. However, the light beam is restricted in the waveguide and may not be emitted out of the waveguide by the out-coupling grating. As shown in FIGS. 6A-6B, in case of only the second grating component 3.2, a left exit pupil-expanded waveguide transmission light beam 5 is split in a region of the second grating component 3.2 in the −x direction, which can likewise achieve two-dimensional replication and expansion for the light beam, but is unlikely to destroy the total reflection condition and emit the light beam out of the waveguide.

Figure 7A:
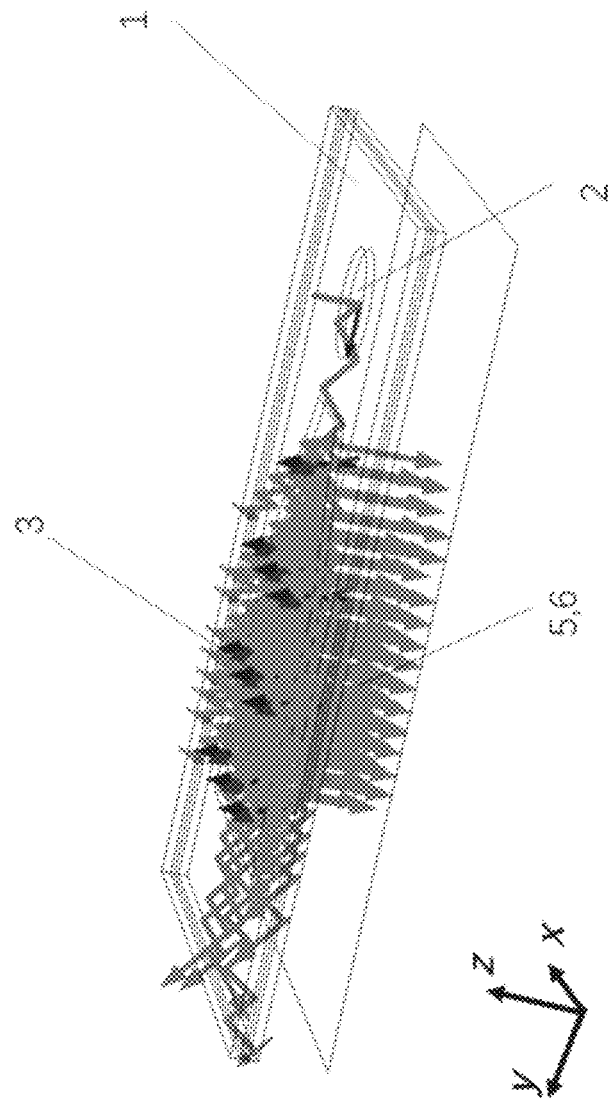
FIGS. 7A-7B show the simulation result of waveguide light path transmission when an out-coupling grating region is composite PVGs (including two grating components, namely, the first grating component 3.1 and the second grating component 3.2) according to the present invention.
Figure 7B:
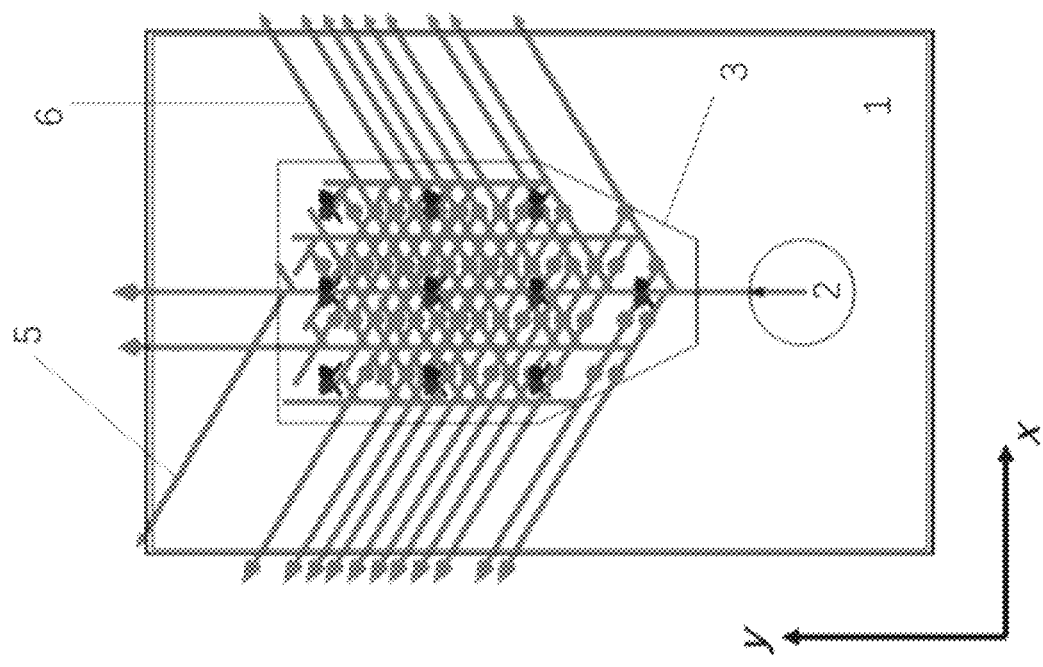

FIGS. 7A-7B show the simulation results of a structure proposed by the present invention. Compared with the structures in FIGS. 5A-5B and FIGS. 6A-6B, an out-coupling grating 3 in the structure of the present invention includes two grating structures, namely the first grating component 3.1 and the second grating component 3.2, at the same time. As can be seen from the simulation results, the transmitted light beam in the waveguide medium 1 at the out-coupling grating 3 is simultaneously split and propagating in the ±x directions, and is emitted out of the waveguide medium 1 along with the replication of the light beam, such that the light beam can be introduced into a next optical system (such as human eyes). This structure achieves the function of two-dimensional exit pupil expansion for the waveguide display system by using only two grating regions, and is thus extremely high in space utilization rate, such that the size and weight of the waveguide are reduced while the exit pupil expansion is achieved.

Figure 8:
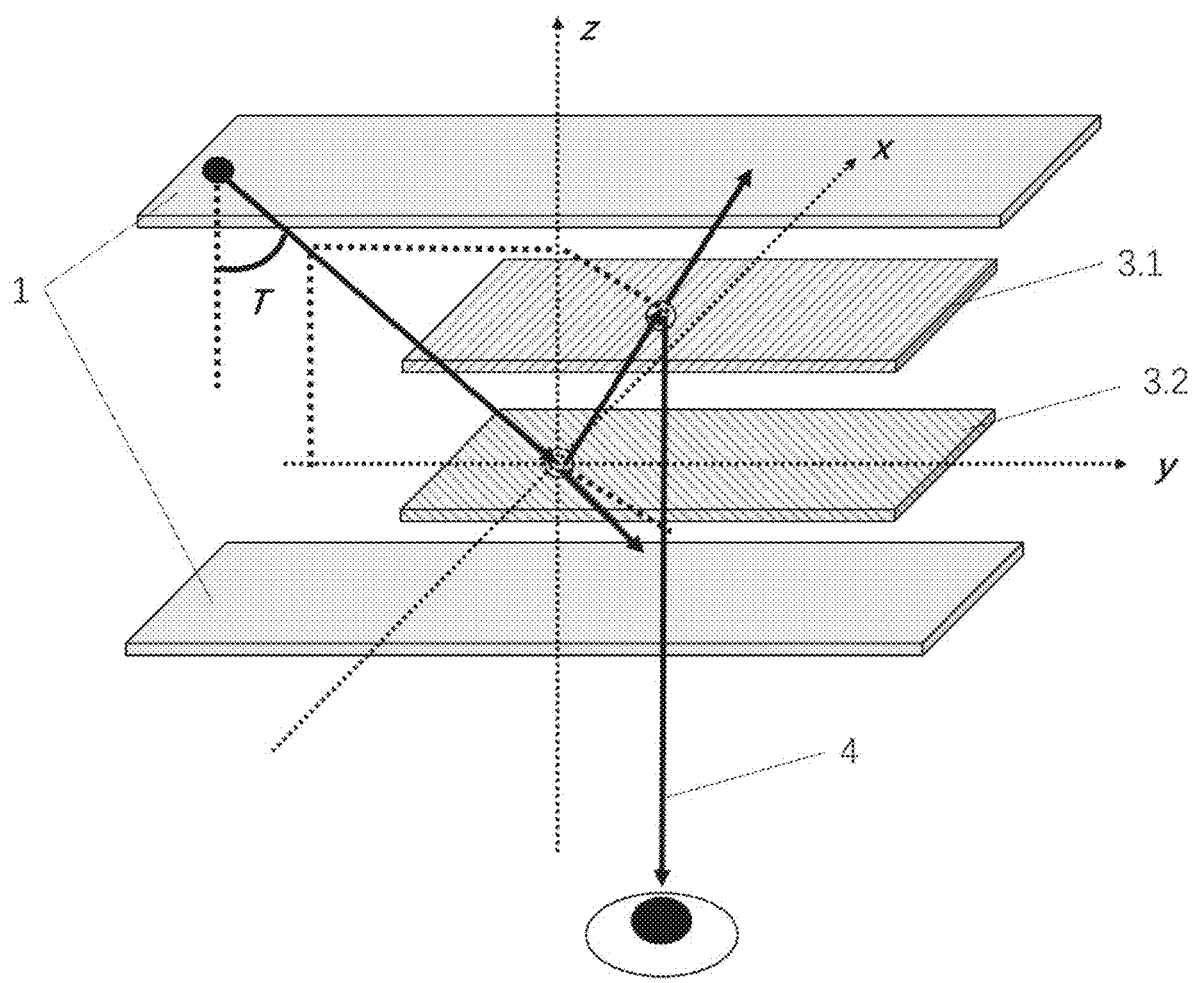
FIG. 8 is a schematic diagram showing the principle of regulating the light beam and propagating an exit pupil-expanded light beam by each component in the composite PVGs in the out-coupling region according to the present invention (in a −x direction)
Figure 9:
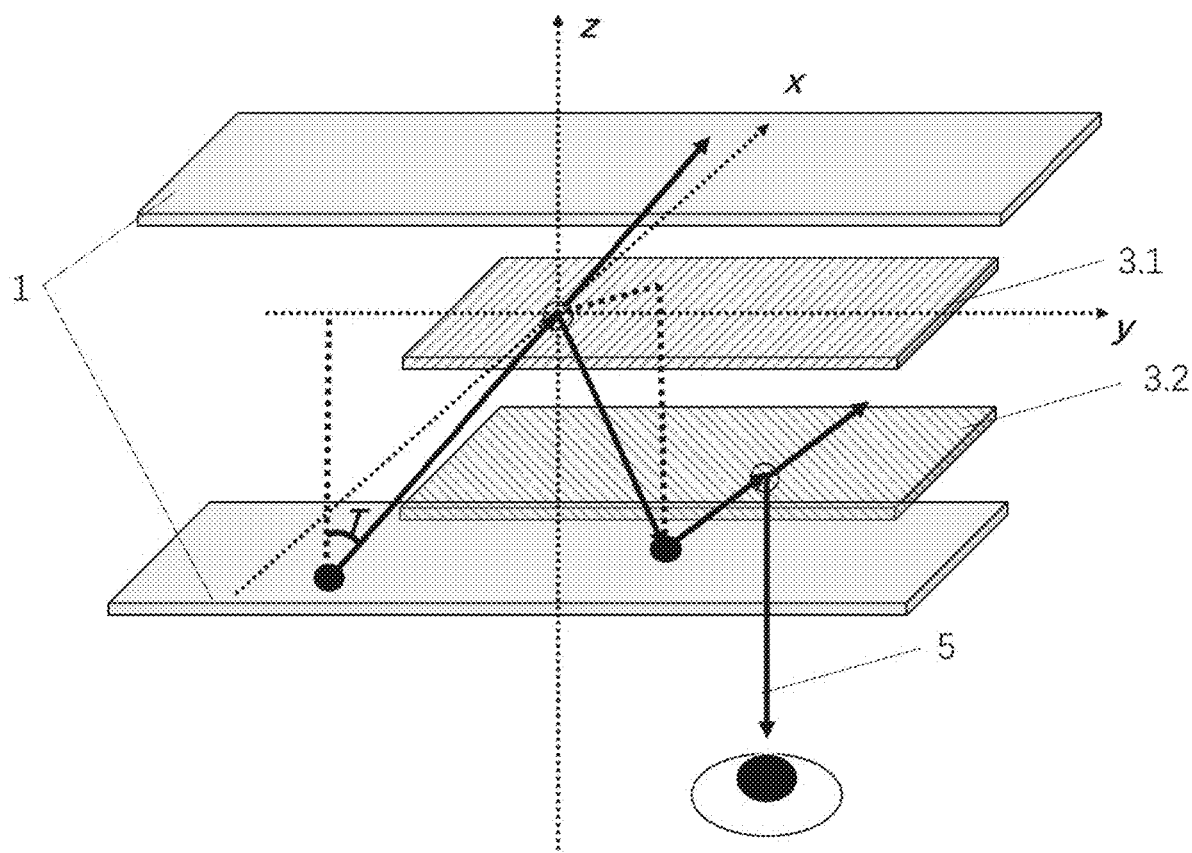
FIG. 9 is a schematic diagram showing the principle of regulating the light beam and propagating an exit pupil-expanded light beam by each component in the composite PVGs in the out-coupling region according to the present invention (in a +x direction)

FIG. 8 and FIG. 9 show the transmission paths and principle for splitting and replicating the light beams towards the +x and −x directions in the out-coupling grating 3 and for emitting the light beams out of the waveguide, respectively. As shown in FIG. 8, taking the light beam transmitting in the yz plane as an example, the light beam propagating and entering the out-coupling grating 3 at a propagation angle T meeting the total reflection condition of the waveguide medium 1 is first diffracted at the second grating component 3.2. Since the grating vector of the second grating component 3.2 has a component in the −x direction (i.e., $\overrightarrow{K3.2xy}$ in FIG. 4), part of the energy of the light beam is diffracted by the second grating component 3.2, and is deflected towards the −x direction when the total reflection condition of the waveguide medium is satisfied; and the other part of energy of the light beam continuously propagates at the same angle as that of the incident light beam. The light beam diffracted by the second grating component 3.2 is diffracted again by the first grating component 3.1 to then destroy the total reflection condition of the light beam in the medium, and thus, is emitted out of the waveguide to enter the next optical system (human eyes in FIG. 8). Similarly, as shown in FIG. 9, the light beam resulting from propagation in the yz plane and propagating and entering the out-coupling grating 3 at the propagation angle T meeting the total reflection condition of the waveguide medium 1 is first diffracted and split at the first grating component 3.1, after which part of the energy is deflected towards the +x direction when the total reflection condition of the waveguide medium is met, and the other part of energy of the light beam continuously propagates at the same angle as that of the incident light beam. The light beam diffracted by the first grating component 3.1 is diffracted by the second grating component 3.2 again and emitted out of the waveguide. With the above working principle, the light beam is repeatedly diffracted, replicated, and emitted by the first grating component 3.1 and the second grating component 3.2 in the composite out-coupling grating 3 (i.e., the composited first and second grating components 3.1 and 3.2) to finally achieve the function of two-dimensional exit pupil expansion.

Figure 10:
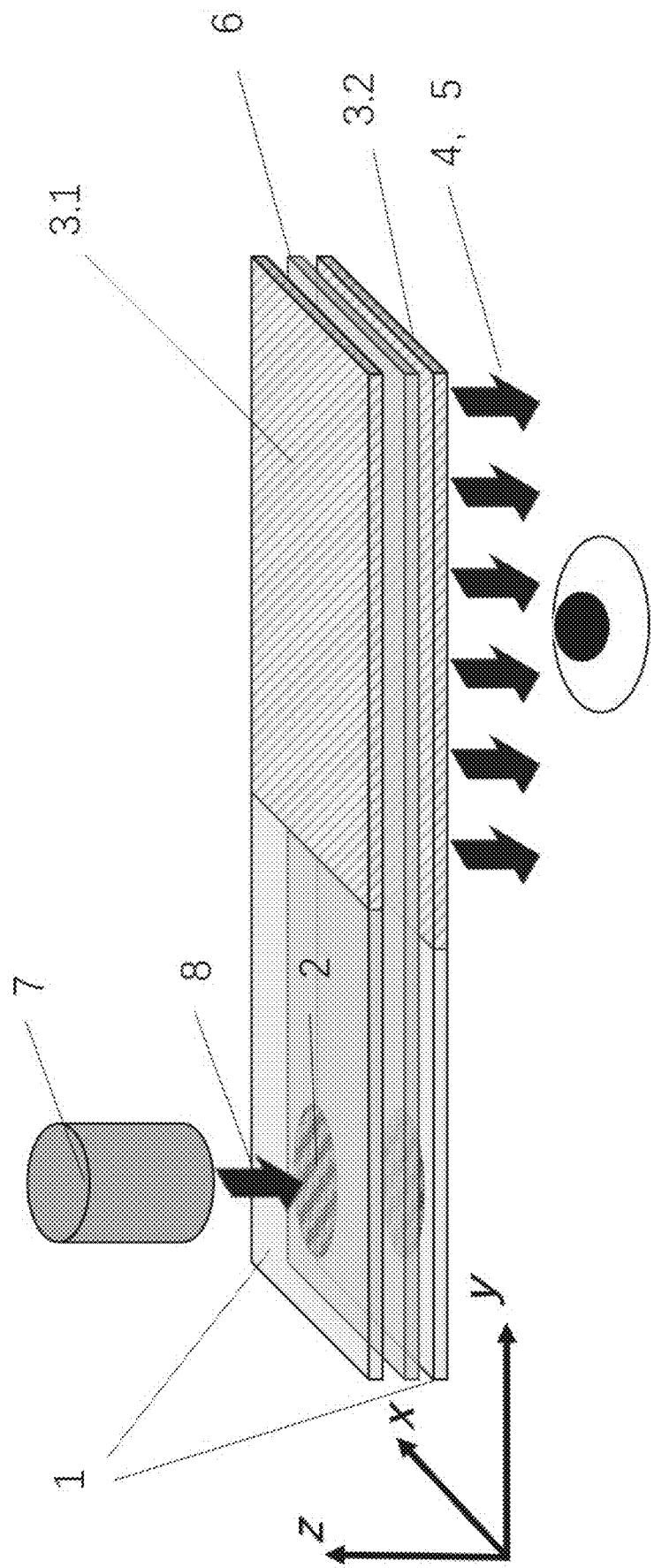
FIG. 10 shows the actual structure of a waveguide display system with efficient two-dimensional exit pupil expansion based on composite PVGs according to the present invention.

As a specific embodiment, FIG. 10 discloses the structure of a waveguide device using the two-dimensional exit pupil expansion method based on the composite exit pupil PVGs. The device is composed of a microimage source light engine 7, a waveguide medium 1, an in-coupling grating 2, an optical matching layer 6, and an out-coupling grating 3. The microimage source light engine 7 may include microimage source devices, such as MicroOLED, LCOS, DMD, MicroLED, and LBS. Meanwhile, the microimage source light engine 7 further includes an optical collimation system configured to complete collimation, projected image enlargement for images from the microimage source device. The waveguide medium 1 is an optical medium having certain refractive index and transmittance, and the material of the waveguide medium may be optical glass, or resin glass with high transparency. The refractive index is in a range of 1.5-2.2, preferably in an optional range of 1.8-2.0. The optical matching layer 6 is an optical binder having a refractive index matching that of the waveguide medium, and may tightly bond the upper and lower parts of the waveguide. Before bonding, the waveguide includes upper and lower parts, each of which includes the above-mentioned first and second grating components 3.1 and 3.2 for out-coupling. After the upper and lower parts of the waveguide are bonded, the out-coupling grating 3 of the waveguide as a whole acts as the composited gratings to achieve the exit pupil expansion of the waveguide as described above.

Figure 11:
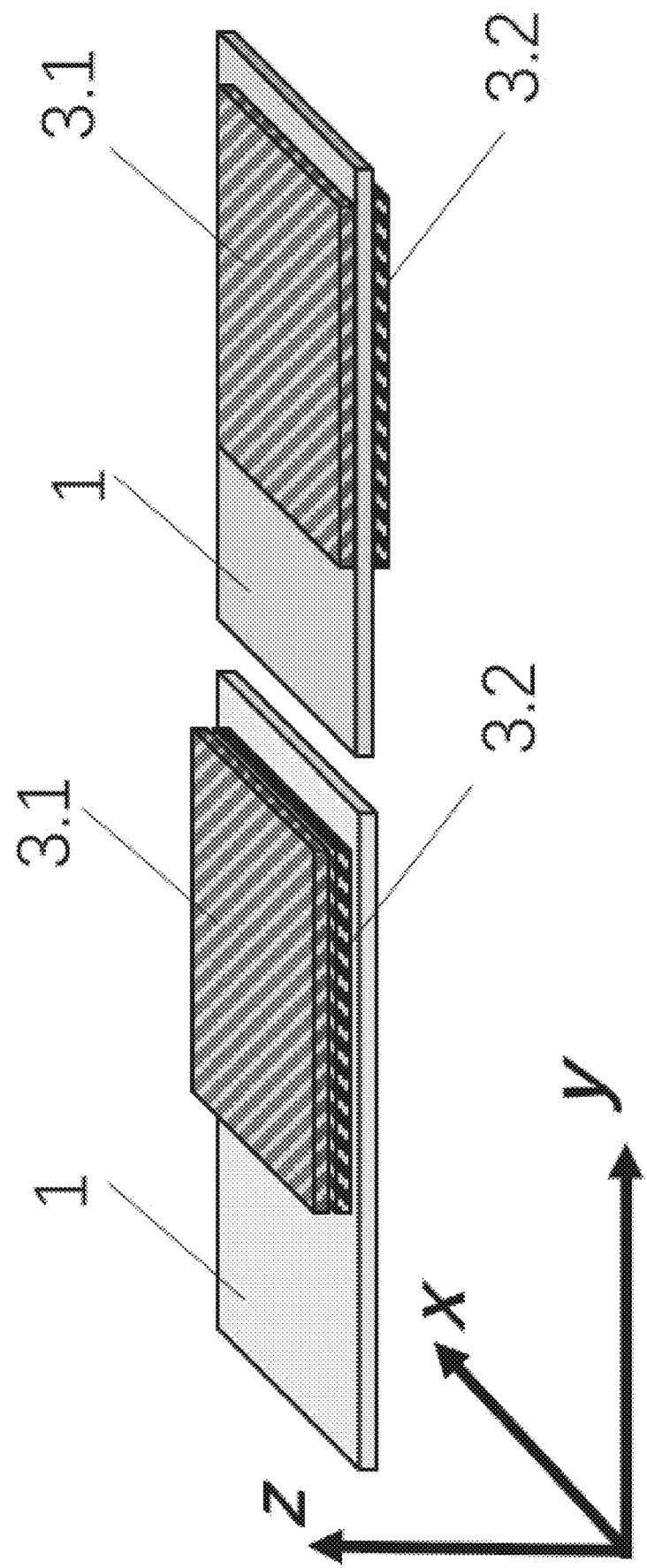
FIG. 11 shows the composite grating structures of two types of monolayer waveguides according to the present invention.

Further, as shown in FIG. 11, the first grating component 3.1 and the second grating component 3.2 may also be placed on the same waveguide without bonding by the optical matching layer. As an example, the first grating component 3.1 and the second grating component 3.2 may be produced by overlaying at the same side of the waveguide as shown on the left side in FIG. 11, or may be produced at either side of the waveguide as shown on the right side in FIG. 11.

What is claimed is:

1. A two-dimensional exit pupil expansion method for a waveguide display based on polarization volume grating (PVGs), comprising implementing a two-dimensional pupil expansion effect at an exit pupil position through a composite structure in an optical waveguide near-eye imaging system including the PVGs as waveguide couplers;

the composite structure comprises a waveguide medium and a two-layer out-coupling grating formed by compositing the PVGs; an in-coupling grating and the two-layer out-coupling grating are disposed at different positions on a waveguide; and when arranged according to a light beam transmission path, the out-coupling grating and the in-coupling grating as a whole are disposed inside or outside the waveguide medium;

the in-coupling grating has predetermined polarization selectivity and is allowed to diffract and emit a left-handed or right-handed elliptically polarized light beam at an angle where a total reflection condition of the waveguide medium is satisfied, wherein the left-handed or right-handed elliptically polarized light beam propagates in the waveguide in a total reflection way;

the two-layer out-coupling grating is disposed at another position on the waveguide medium, and is allowed to re-diffract a light beam in the waveguide at an angle smaller than an angle where a total reflection condition of the waveguide medium is satisfied, to emit the light beam in the waveguide medium out of the waveguide and introduce the light beam into a next human eye or other visual optical systems;

each one of the PVGs is a cholesteric-phase liquid crystal layer with two-dimensional periodicity such that an optical axis of each of the PVGs rotates at different angles in two different dimensions, and the PVGs have Bragg diffraction characteristics and polarization selectivity;

at least two PVGs are provided at different positions on the waveguide medium and configured to complete introduction of light rays into the waveguide medium and emission of exit pupil-expanded light rays, respectively; and the at least two PVGs are called the in-coupling grating and the two-layer out-coupling grating, respectively;

the two-layer out-coupling grating is formed by compositing the at least two PVGs such that grating vectors of the at least two PVGs are oriented in different directions, wherein each of the grating vectors define a plane of equal refractive index in the respective PVG inclined at a given angle; and the two-layer out-coupling grating is allowed to first steer the light beam transmitting in the waveguide medium to change a propagation path of the light beam in the waveguide, and at the same time emit the light beam out of the wave guide when the light beam is incident into the out-coupling grating again after the steering, to achieve functions of exit pupil expansion and coupled emission.

2. The two-dimensional exit pupil expansion method for the waveguide display based on the PVGs according to claim 1, wherein
the waveguide medium is an optical medium having predetermined refractive index and transmittance, with the refractive index in a range of 1.5-2.2; and
a material for the waveguide medium is optical glass, or resin glass with high transparency, and the waveguide medium is shaped as a flat plate or an additional free-form surface.

3. The two-dimensional exit pupil expansion method for the waveguide display based on the PVGs according to claim 1, wherein
the in-coupling grating is allowed to further efficiently diffract and couple any polarized light beams by compositing two types of polarization-responsive PVGs.

* * * * *